US006903837B1

(12) United States Patent
Moreau et al.

(10) Patent No.: US 6,903,837 B1
(45) Date of Patent: Jun. 7, 2005

(54) METHOD AND DEVICE FOR PREDICTING THE QUANTITY OF PRINTING PRODUCT AVAILABLE IN A PRINTER AND NECESSARY FOR PRINTING A DOCUMENT

(75) Inventors: Jean-Jacques Moreau, Rennes (FR); Mickaël Lorgeoux, Rennes (FR)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 09/420,777

(22) Filed: Oct. 19, 1999

(30) Foreign Application Priority Data

Oct. 23, 1998 (FR) .......................................... 98 13316
Oct. 23, 1998 (FR) .......................................... 98 13315

(51) Int. Cl.[7] .......................... G06K 15/00; G03G 9/00; G06F 15/00

(52) U.S. Cl. ......................... 358/1.15; 358/1.9; 399/24; 399/27; 399/61; 347/158; 347/214

(58) Field of Search ................. 358/1.1–1.9, 1.11–1.18, 358/406, 296; 399/24, 25, 27, 28, 29, 11, 43, 49, 57, 58, 60–62; 347/6, 7, 19, 84–86, 100, 158, 214

(56) References Cited

U.S. PATENT DOCUMENTS

| | | | | |
|---|---|---|---|---|
| 4,413,264 A | | 11/1983 | Cruz-Uribe et al. | 346/1.1 |
| 4,961,088 A | * | 10/1990 | Gilliland et al. | 399/25 |
| 5,160,966 A | | 11/1992 | Shiina et al. | 355/206 |
| 5,202,769 A | | 4/1993 | Suzuki | 358/300 |
| 5,508,786 A | | 4/1996 | Ogiri et al. | 355/206 |

(Continued)

FOREIGN PATENT DOCUMENTS

| | | |
|---|---|---|
| EP | 707969 A2 | 4/1996 |
| EP | 707969 A3 | 8/1997 |
| JP | 62-158049 | 7/1987 |
| WO | WO 97/27061 | 7/1997 |

OTHER PUBLICATIONS

Pat. Abs. of Japan, vol. 096, No. 008, Apr. 2, 1996 (JP 08–088706 A).

Pat. Abs. of Japan, vol. 008, No. 022 (M–272), Oct. 24, 1983 (JP 58–181680A).

Pat. Abs. of Japan, vol. 011, No. 342 (P–635), Jun. 6, 1987 (JP 62–125384A).

Pat. Abs. of Japan, vol. 014, No. 132 (M–0948), Jan. 8, 1990 (JP 02–003357A).

Pat. Abs. of Japan, vol. 018, No. 258 (M–1606), Feb. 15, 1994 (JP 06–040011A).

Pat. Abs. of Japan, vol. 081, No. 154 (M–1577), Dec. 14, 1993 (JP 05–330196).

Pat. Abs. of Japan, vol. 097, No. 011, Jul. 22, 1997 (JP 0187963A).

Pat. Abs. of Japan, vol. 018, No. 309 (P–1753), Mar. 11, 1994 (JP 06–067507).

Pat. Abs. of Japan, vol. 097, No. 001, Sep. 17, 1996 (JP 08–238780).

*Primary Examiner*—King Y. Poon
(74) *Attorney, Agent, or Firm*—Fitzpatrick, Cella, Harper & Scinto

(57) ABSTRACT

In predicting a quantity of a printing product necessary for printing a document, the document is stored in its entirety as digital data. Each page of the document is divided into bands of the digital data. From the digital data, a table of limited capacity is created, which describes at least part of a monochromatic component of one of the bands, with the monochromatic component corresponding to the printing product and each cell of the table representing at least a pixel. A number of switched-on pixels in the table is counted, with a switched-on pixel corresponding to a pixel for which a portion of the printing product must be ejected. Before enabling or demanding printing, a necessary quantity of the printing product is derived from a number of switched-on pixels corresponding to each band.

68 Claims, 7 Drawing Sheets

U.S. PATENT DOCUMENTS 5,636,032 A 6/1997 Springett .................... 358/296
5,724,627 A 3/1998 Okuno et al. ................. 399/27
5,729,351 A 3/1998 Oh ............................. 358/296
5,754,750 A * 5/1998 Butterfield et al. ......... 345/418
5,794,094 A 8/1998 Boockholdt et al. .......... 399/27
5,802,420 A 9/1998 Garr et al. .................... 399/27
5,971,633 A * 10/1999 Sano ........................... 400/76
5,991,515 A * 11/1999 Fall et al. .................. 358/1.15
6,019,461 A 2/2000 Yoshimura et al. ........... 347/86
6,209,986 B1 * 4/2001 Tatsuzawa ................... 347/40
6,791,704 B1 * 9/2004 Moreau et al. ............ 358/1.15

* cited by examiner

METHOD AND DEVICE FOR PREDICTING THE QUANTITY OF PRINTING PRODUCT AVAILABLE IN A PRINTER AND NECESSARY FOR PRINTING A DOCUMENT

The invention relates to a method of predicting the quantity of one or more printing products necessary for printing a document stored in the form of digital data, for example in a computer, the latter being able to control a printer associated with it directly or indirectly via a network. The invention also concerns a device for implementing the method.

The invention also applies to a method of managing printing product resources available in a colour printer, for printing a document stored in the form of digital data, for example in a computer, the latter being able to control said printer associated with it directly or indirectly via a network. The invention also concerns a device for implementing the method.

A printer contains at least one and generally several reservoirs of printing products. Some reservoirs can be integrated into the same cartridge comprising several compartments. For example, an inkjet printer for "black and white" printing contains a single reservoir of black ink. On the other hand, an inkjet colour printer contains printing products of different colours, notably cyan, magenta and yellow. In addition, a reservoir of black printing product is provided. On certain high-performance printers, use may be made of printing products of different shades of these three colours. It will also be possible to use other colours such as red, blue, green, white, silver and gold. Printing a document will use all or some of the printing products present in the different reservoirs. Obviously, the quantity of a particular printing product used depends notably on the content of the document to be printed. A simple typed document will require a printing product in a single colour, usually black. On the other hand, an illustrated report may contain images and graphs using colours. In this case, the printer will consume at least black, blue, magenta and cyan in variable proportions.

The quantity of printing product consumed also depends on the configuration of the printer at the time of printing. Certain printers make it possible to use one printing mode amongst several possible ones, of low, medium or high resolution, in black and white and in colour. Consequently the same printer may consume very different quantities of printing product, for the same document stored in digital form, according to the print mode selected.

The quantity of printing product consumed also depends on the physical characteristics of the printing means. It depends notably, for an ink-jet printer, on the type of reservoir or cartridge used, the diameter of the ink ejection nozzles on the print head and the very nature of the printing product, the size of the droplets ejected depending on the pigments used, and therefore the colour.

The quantity of printing product consumed also depends on the characteristics of the paper used. For example a high-weight glossy paper will have to receive a larger quantity of printing product than an ordinary paper.

Finally, it should be noted that the quantity of printing product consumed depends also on the characteristics of the environment: levels of humidity, pressure, temperature, etc. These characteristics are unstable by nature and falsify predictions. All the others can be predetermined or known.

For all these reasons, it is frequent for one reservoir to empty much before the others. If all the reservoirs are independent, wastage of expensive printing products can be avoided, but frequent interventions are necessary. If reservoirs are combined in one and the same cartridge, the exhaustion of one gives rise to the wastage of the products in the other colours.

It is therefore desirable not only to be able to measure the quantities of printing products available in the reservoirs at a given moment but also to be able to predict the quantities necessary for printing a document (provided that this is stored in the form of digital data) or different parts thereof, notably the different pages which make it up. From these two series of information, better management of the use of the printing product resources can be envisaged.

Certain printers are provided with means of measuring the quantity or quantities of printing product available in a reservoir or cartridge compartment during use. Such a printer is for example described in the application PCT 97/00366. If the printer is connected to a computer, the measurements can be transmitted to it by an interface card and can be processed and/or displayed on a control screen of this computer.

U.S. Pat. No. 4,413,264 describes a method for predicting the quantity of ink necessary for printing a typographic text in a predetermined grey level. The text is run through so as to determine the number of times each character appears, according to a given typography and with a chosen grey level. The system also has in memory the quantity of ink necessary for printing each character, for each typography and for each possible grey level. From these data, it is possible to derive therefrom the quantity of ink necessary for printing the text. This system is limited to the printing of texts which are entirely typed in predetermined typographies. It does not make it possible to predict the quantity of ink necessary for printing a document containing graphs or images. This system is inapplicable for colour reproduction.

In addition, U.S. Pat. No. 5,636,032 describes a system for estimating the number of pages which a printer is able to print. When a document is stored in the form of digital data, it is converted in order to constitute a table describing a monochromatic component of the document in the form of pixels. Reading such a table makes it possible, in the case of an inkjet printer, to control the ejection of the dots of liquid printing product at predetermined locations on the sheet of paper, constituting the coordinates of the different pixels. It is said that a pixel is "switched on" in such a table if the cell corresponding to this pixel contains information indicating that a droplet of printing product must be ejected at this pixel location.

According to the teachings of this prior patent, at the very time of printing one of the pages, the number of pixels switched on in this page is counted and the quantity of quantities of printed product used to print it is derived. To this end, for each ink reservoir which can be used by the printer, the mean volume of ink necessary for printing a pixel is stored. However, the process can effect only a relatively imprecise estimation of the quantities necessary since it is implemented simultaneously with the printing of a page. The estimation therefore assumes that all the pages which remain to be printed will require the same quantities of printing product as before. This is not always the case in practice. For example, if the document in question includes a text followed by graphics and drawings, the prediction made on the first pages of the text proves to be completely falsified when it is a case of printing the end of the document, of a completely different nature.

The invention makes it possible to resolve this problem by proposing a method of predicting the quantity of a printing product necessary for printing a document, which is reliable and precise, whatever the nature of the document.

More precisely, the invention concerns a method of predicting the quantity of a printing product necessary for printing a document, characterised in that it consists of storing the entire document in the form of digital data, creating, from these data, a table describing at least part of a monochromatic component of said document, said component corresponding to the printing product and each cell in said table representing a pixel, counting the number of pixels said to be switched on in this table and deriving therefrom a necessary quantity of said printing product before enabling or demanding said printing.

Thus the use of the method set out above makes it possible to produce information which can be used by a user. This information can for example be the display of the quantities of printing product necessary for printing an entire document stored. If the document stored in digital form has previously been broken down into a certain number of pages, the information can consist of indicating the quantities necessary for printing each page. This will make it possible to evaluate the cost of printing a document, in total or page by page.

In addition, if the process indicated above has been initialised or reset to zero on start-up or when a reservoir is changed for the corresponding printing product, it will be possible easily to count the quantities successively employed for printing different documents and to derive therefrom the quantity of printing product remaining in each reservoir. The quantity or quantities can also be displayed. Likewise, at the time of printing the document stored lastly, it will be possible, from these informations, to determine whether the entire document can be printed without changing at least one of the reservoirs or, failing this, the number of pages which can be printed.

The method which has just been disclosed will preferably be implemented in a computer connected to a printer. In addition, the use of computers in a network is becoming more and more frequent. Under these conditions, if a computer contains a document stored in digital form, it will be possible to cause this document to be printed by a specific printer connected to another computer in the network. The prediction can be calculated by the computer containing the document before the latter is transmitted in digital form to another computer specifically connected to the printer in question. In this case, the necessary parameters relating to the characteristics of the printer and the printing product and those relating to the choice of the printing mode can be exchanged by the network between the computers.

In order to avoid the representation of the monochromatic component or components of said document in the form of pixels occupying too much space in the memory of the computer, the method according to the invention is supplemented by the fact that an aforementioned table is created with limited capacity, less than the capacity necessary for describing the monochromatic component or components of said document. Groups of pixels of said monochromatic component are entered successively therein and on each occasion the number of pixels switched on are counted until the whole of said monochromatic component has been entered in said table and all its switched-on pixels have been counted.

Preferably, each table of limited capacity is created from digital data representing adjacent bands of the document.

In order to be able to apply, to the digital data represented in the form of pixels, corrections desirable for printing, by using known correction algorithms, the method according to the invention makes provision for selecting wider, overlapping bands of said document. From digital data corresponding to the wider bands, at least one enlarged table is created allowing an image reprocessing entailing a modification of the switched-on pixels. Consequently, the enlarged table is modified by applying a known correction algorithm and the switched-on pixels corresponding to the excess part of the large table, that is to say the part where the bands overlap, are excluded from the counting.

In the case of a colour printing, as many enlarged tables as there are colours are created, each one describing a monochromatic component of the document. In a manner known per se, a correction algorithm is applied to each table before separately effecting the counts of the switched-on pixels so as to predict the different quantities of the printing products necessary, of all the colours concerned, in order to print part of the document corresponding to a band. After which, the tables reset to zero receive the pixels of the following band.

When the switched-on pixels have been counted, it suffices to multiply their number by a value representing an elementary quantity of the printing product. In the case of an inkjet printer, the value in question represents the volume of a dot of printing product ejected on each occasion by the print head. Obviously this value depends on the printing product, as indicated previously. It also depends on the type of printer and/or the type of print head. The computer can easily contain in memory a set of such values taking into account all the equipment and products available on the market and it will be in a position to select one of them according to an effective combination of such parameters.

Naturally, the invention also concerns a device for predicting the quantity of a printing product necessary for printing a document, characterised in that it has a means for storing the whole of said document in the form of digital data, means for creating, from these data, a table describing at least part of a monochromatic component of said document, said component corresponding to said printing product and each cell in said table representing a pixel, means for counting the number of so-called switched-on pixels in this table and means for deriving therefrom a necessary quantity of said printing product before enabling or demanding said printer.

Another object of the invention is to improve the management of the printing product resources used by the colour printer, notably in connection with the printer, by combining the predictions of the quantities of printing product necessary for printing a document and the actual measurements of quantities of printing products available in the reservoirs of the printer at the time when it is wished to print.

The basic idea consists of choosing the order of printing of the different pages so that at least several reservoirs are empty or almost empty at the same time.

Consequently, by way of application of the methods defined above, the invention also concerns a method of managing printing product resources available in a colour printer containing several reservoirs of different printing products, characterised in that it consists of dividing a document stored in the form of digital data, into groups of such data representing pages, predicting, as indicated above, the quantity of each printing product necessary for printing each page, also measuring, before printing, the quantity of printing product actually available in each reservoir, seeking a selection of pages which would ensure the exhaustion, at least approximately simultaneously, of at least one group of reservoirs, and at least sending a message and/or triggering the implementation of a processing, entailing said selected pages, such as for example the printing of such selected pages.

Amongst the messages which can be displayed, there can be mentioned the prediction of the quantities of printing products necessary for printing each page, the quantities available after printing, information on the possibility or impossibility of actually printing the document entirely without having to change at least one reservoir. In particular the information broadcast can also indicate the pages of the document (for example identified by their numbers) which it is possible to print without having to change at least one reservoir, knowing that any selection of such pages may make it possible to waste less printing product, notably if certain reservoirs form part of the same cartridge.

The step consisting of seeking a selection of pages which will ensure the simultaneous exhaustion of at least one group of reservoirs takes longer to implement, the higher the number of pages. There is an advantage in seeking whether part of the document to be printed can be printed in the natural order of the pages and nevertheless allow the almost simultaneous exhaustion of at least several reservoirs.

Consequently, the method defined above can be supplemented by the operations consisting of predicting the quantity of each printing product necessary to print the pages in their natural order, updating after each series of predictions concerning a page the quantity of each printing product which would actually be available in each reservoir, checking after each updating whether at least several reservoirs are almost empty, actually printing the pages thus tested and at least sending a message indicating the need to change or fill the reservoirs.

After the change of the reservoirs concerned, the processing is resumed on the remaining pages, considering a reduced number of pages. During the processing of the pages in their natural order, the predicted quantities of products consumed for each page are stored in memory, with a view to a possible need for selection.

It should be noted that the operations consisting of predicting the quantity of each printing product necessary for printing each page can be made a priori as soon as the document has been divided, in digital form, into groups of digital data representing pages.

As will be seen subsequently, the predictions can be made once and for all and, in this case, an operation consisting of predicting a quantity of printing product necessary for printing a page is summarised as seeking the precalculated value in a memory where it was previously recorded. A prediction operation can therefore, according to circumstances, consist of an actual calculation which will be disclosed below or a simple reading of a stored value, previously calculated during the unfolding of a global and autonomous prediction process for the quantities of printing products necessary for printing each page.

The implementation of a process of selecting pages proper is triggered by a particular test. More particularly, it is checked page after page whether there is a change from a state where all the reservoirs in said group are not empty to a state where at least one of them is completely empty. It is decided to implement such a selection when this event occurs. When such a selection is decided on and if the quantities of printing product necessary have not been calculated previously, a prediction is made of the quantity of each printing product necessary for printing the remaining pages, and they are stored. The selection then consists of seeking a subgroup of pages whose printing would result in at least several reservoirs being almost empty at the end of the printing of these pages. Such a selection is notably advantageous if the subgroup is such that all the corresponding reservoirs are structurally connected and form a cartridge. In this case, the selection would result in finding the pages to be printed so that all the reservoirs in the cartridge are empty at the end of the printing of said subgroup. As a variant, merely several reservoirs in a cartridge can be empty at the end of the printing of this subgroup. If the selection process ends at a satisfactory solution, said subgroup of pages is actually printed and at least one message is sent indicating the need to change or fill the reservoirs.

The method which has just been set out can preferably be essentially implemented in a computer connected to a printer. However, it is becoming more and more frequent to use computers in a network. Under these circumstances, if a computer contains a document stored in digital form, it will be possible to have this document printed by a specific printer connected to another computer in the network. The predictions can be calculated by the computer containing the document before the latter is transmitted to the other computer specifically connected to the printer in question. In this case, the necessary parameters relating to the characteristics of the printer and printing products and those relating to the choice of the printing mode can be exchanged by the network between the computers.

In order to avoid the representation of the monochromatic component or components of said document in the form of pixels occupying too much space in the memory of the computer, the method according to the invention is supplemented by the fact that an aforementioned table is created with limited capacity, less than the capacity for describing the monochromatic component or components of said document. Groups of pixels of said monochromatic component are entered successively therein and on each occasion the number of pixels switched on are counted until the whole of said monochromatic component has been entered in said table and all its switched on pixels have been counted.

Preferably, each table of limited capacity is created from digital data representing adjacent bands of the document.

In order to be able to apply, to the digital data represented in the form of pixels, corrections desirable for printing, by using known correction algorithms, the method according to the invention makes provision for selecting wider, overlapping bands of said document. From digital data corresponding to the wider bands, at least one enlarged table is created allowing an image reprocessing entailing a modification of the switched-on pixels. Consequently, the enlarged table is modified by applying a known correction algorithm and the switched on pixels corresponding to the excess part of the large table, that is to say the part where the bands overlap, are excluded from the counting.

In the case of a colour printing, as many enlarged tables as there are colours are created, each one describing a monochromatic component of the document. In a manner known per se, a correction algorithm is applied to each table before separately effecting the counts of the switched on pixels so as to predict the different quantities of the printing products necessary, of all the colours concerned, in order to print part of the document corresponding to a band. After which, the table reset to zero receives the pixels of the following band.

When the switched-on pixels have been counted, it suffices to multiply their number by a value representing an elementary quantity of the printing product. In the case of an inkjet printer, the value in question represents the volume of a dot of printing product ejected on each occasion by the print head. Obviously this value depends on the printing product, as indicated previously. It also depends on the type of printer and/or the type of print head. A computer can easily contain in memory a set of such values taking into account all the equipment and products available on the market and will be in a position to select one of them according to an effective combination of such parameters.

With regard to the actual measurement of the quantity or quantities of printing product available in the corresponding reservoir or reservoirs, it will be possible, for each reservoir, to arrange a capacitive branch including said reservoir to apply an alternating signal to this capacitive branch and to analyse a resulting signal in order to derive therefrom said quantity of printing product actually available in this reservoir.

Naturally, the invention also concerns a device for managing printing product resources available in a colour printer containing several reservoirs of different printing products, characterised in that it has means for dividing a document stored in the form of digital data into groups of such data representing pages, means for predicting the quantity of each printing product necessary for printing each page, means for measuring, before printing, the quantity of printing product actually available in each reservoir, means for seeking a selection of pages which will ensure the exhaustion, at least approximately simultaneously, of at least one group of reservoirs, and means for sending a message and/or triggering the implementation of a processing, entailing said selected pages, such as for example the printing of such selected pages.

The invention will be more clearly understood by means of the following description of a computer system comprising a printer and at least one computer equipped and programmed to implement the invention, given solely by way of example and with reference to the accompanying drawings, in which.

A device able to implement the invention can be integrated into a printer. However, and preferably, it can consist of a computer 20 connected to different peripherals including notably a printer.

Figure 1:
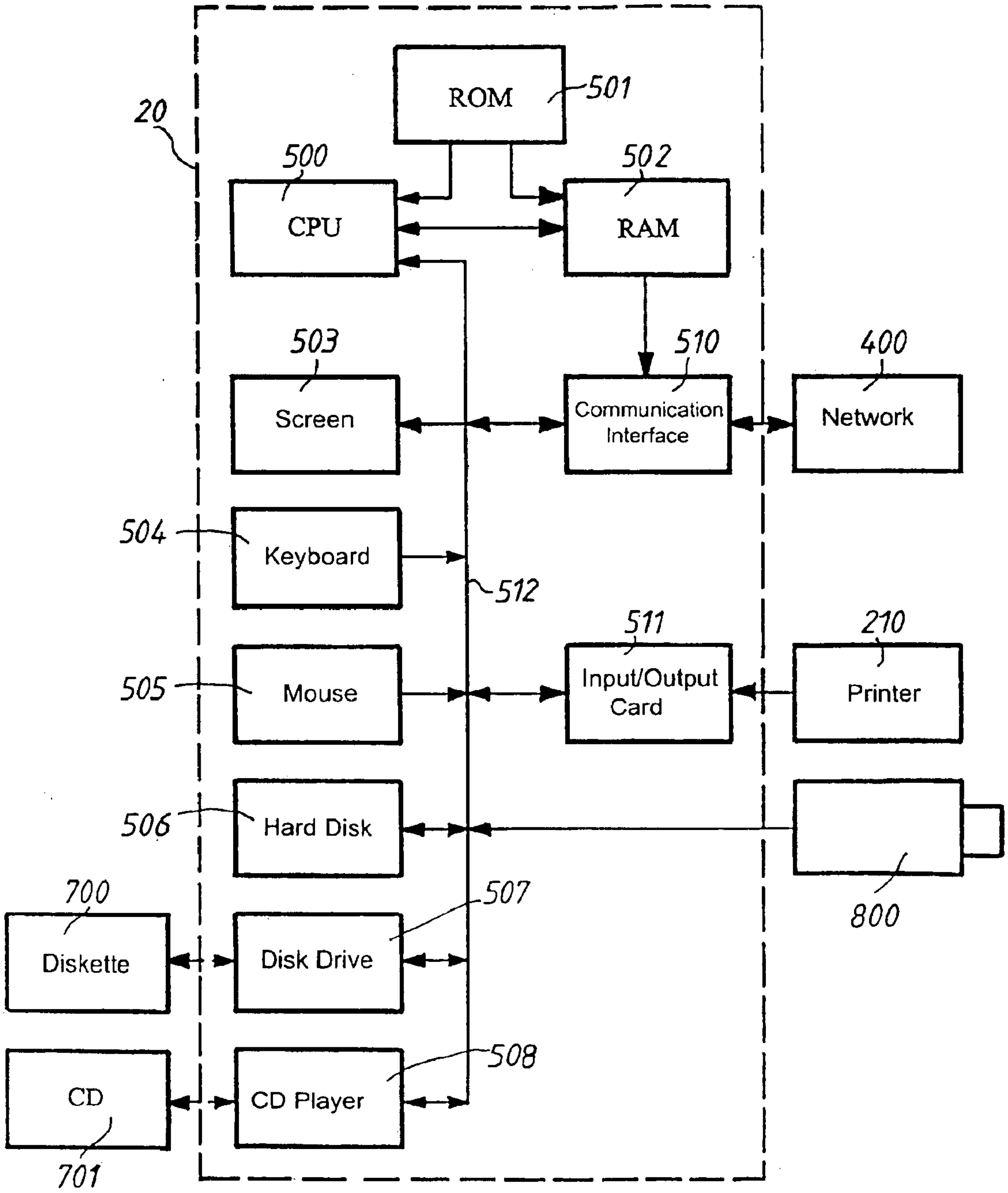
FIG. 1 is a block diagram of a computer/printer assembly implementing the invention.

This is what is depicted in FIG. 1. The computer has a communication interface 510 connected to a communication network 400 by means of which it can notably exchange information with other computers. It also has a storage means 506 known as a "hard disk", a disk drive 507 and a CD drive 508. These drives can respectively receive a diskette 700 and a CD 701. These components, and the hard disk 506, can contain documents within the meaning of the invention, and the code for implementing the invention which, once read by the computer 20, will be stored in the hard disk 506. According to a variant, the program enabling the computer to implement the invention can be stored in read only memory 501 (designated ROM in FIG. 1). According to another possible variant, the program can be loaded as required in order to be stored in identical fashion to that described above, by means of the network 400.

The computer is supplemented by a screen 503 for displaying the documents to be printed, serving as an interface with the user who wishes to modify these documents, by means of a keyboard 504 and/or a mouse 505 or any other control means. The screen 503 also makes it possible, at the request of the user, to display the volumes of the different printing products which will be liable to be consumed by the printer 210 if a document available in the form of digital information in the computer or one of its peripherals is to be printed. These volumes can be determined and displayed for each page. The instructions relating to the implementation of the method according to the invention are executed by a central unit 500 (CPU in FIG. 1). The instructions are stored in the read only memory 501 or in the other information storage elements available. On powering up, the programs relating notably to the implementation of the invention, stored in one of the non-volatile memories, such as for example the read only memory 501, are transferred into a random access memory 502 (RAM in FIG. 1), which then contains the executable code of the invention and the variables and parameters necessary to its implementation.

The different subassemblies of the computer 20 which have just been mentioned exchange information with each other by means of a communication bus 512, which also makes it possible, by virtue of the interface 510, to route information coming from the network 400 or to transmit information to this network. Where it is a case of any reproduction of images, a digital camera 800 can be connected to the bus 512.

Figure 2:
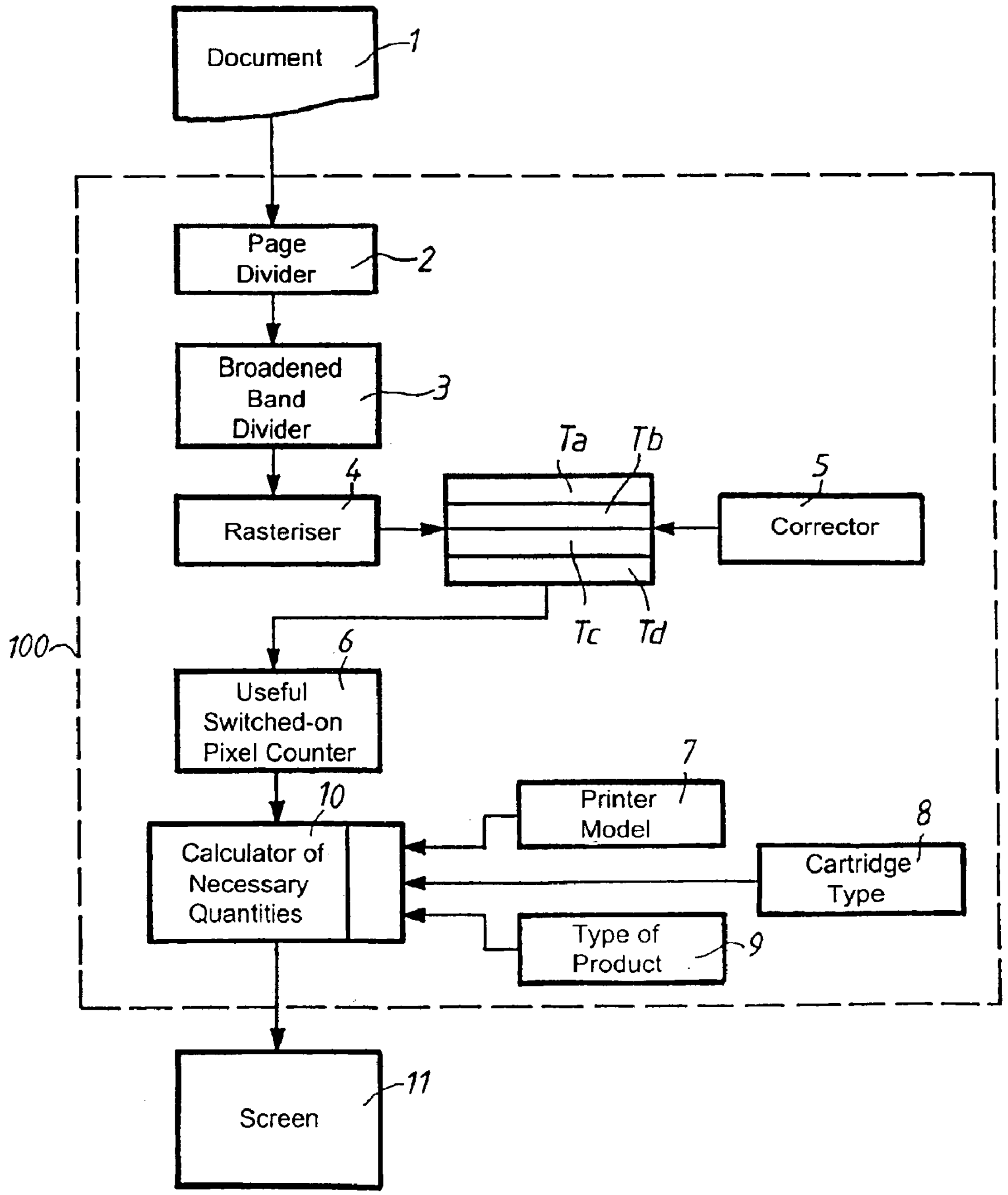
FIG. 2 is a block diagram of the means specific to implementing the invention for predicting the quantity of each printing product necessary for printing a colour document stored in the form of digital data.

FIG. 2 depicts a functional block diagram of a device 100 able to implement the method of predicting the quantity or quantities of printing product necessary to the printing, page by page, of a document, provided that it is functionally interposed between a file 1 containing the document in the form of digital information and a screen 11 able to display the results, that is to say the quantities of the printing product necessary for printing the document stored in the file 1. The device can, as has been seen, be comprised in the computer, but it can also be produced in the form of a self-contained unit housed in the printer itself or forming part of an interface circuit. The device has a page divider 2 responsible for dividing the electronic document stored in the file 1 into groups of information, each group representing a page. Each page contains a more or less large part of the document according to the format chosen for reproduction, the size of the sheets of paper, etc. The information representing each page is then divided into wider bands by a broadened band divider 3. It should be stated that such a broadened band consists of the digital information representing a band of the page under consideration increased by an overlap margin belonging to the following band. The broadened band information determined by the divider 3 is transmitted to a conversion system, referred to as "rasteriser" 4, which transforms the digital information transmitted by the divider 3 into several tables $T_a$, $T_b$, $T_c$, $T_d$ . . . each describing part of a monochromatic component of the document, each cell of the table representing a pixel. More precisely, each cell of a table (memory) contains the coordinates of a pixel and an item of information representing the fact that this pixel is "switched on" or not. In the example, the part of the monochromatic component is that which corresponds to the broadened band currently being processed. If the document to be printed is monochromatic (black ink for example), the rasteriser generates and fills a single table. If it is a case of a document to be printed in colour, the rasteriser 4 generates as many tables $T_a$, $T_b$, $T_c$, $T_d$ as there are monochromatic components necessary for printing the document, for example black, cyan, magenta and yellow. Each table is then subjected to the action of a corrector 5 able to apply to the table a correction entailing modifications to the switched-on pixels, improving the quality of the document to be printed. The corrector 5 implements known algorithms. When the corrector has applied such algorithms in order to modify the switched-on pixels in the different tables $T_i$, these are read and the so-called switched-on pixels are counted by a switched-on pixel counter 6. It should be noted that this counter counts only the "useful" switched-on pixels of the table or tables, that is to say the pixels corresponding to the band under consideration, not including the margin overlapping with the following band. The results of these countings are sent to a calculator for the volumes of printing product, which multiplies the number of pixels switched on in each table by a predetermined quantity calculated from information selected in memories 7, 8 and 9.

For example, the memory 7 makes it possible to select a parameter representing the model of the printer. The memory 8 makes it possible to select a parameter representing the type of reservoir or cartridge. The memory 9 makes it possible to select a parameter representing the printing product used.

All these parameters make it possible to calculate the mean volume of a droplet of printing product ejected at the location of each switched on pixel. The computer 10 determines the volumes of corresponding printing product and, when all the bands of all the pages of the document have been analysed, the calculator 10 can demand the display, on the screen 11, of the volumes of the different printing products necessary for printing each page on the one hand and the entire document on the other hand.

In addition, according to the invention, information on a selection of pages to be printed in order to optimise the consumption of printing product are also displayed on the screen 11, after implementing the method described below.

Figure 3:
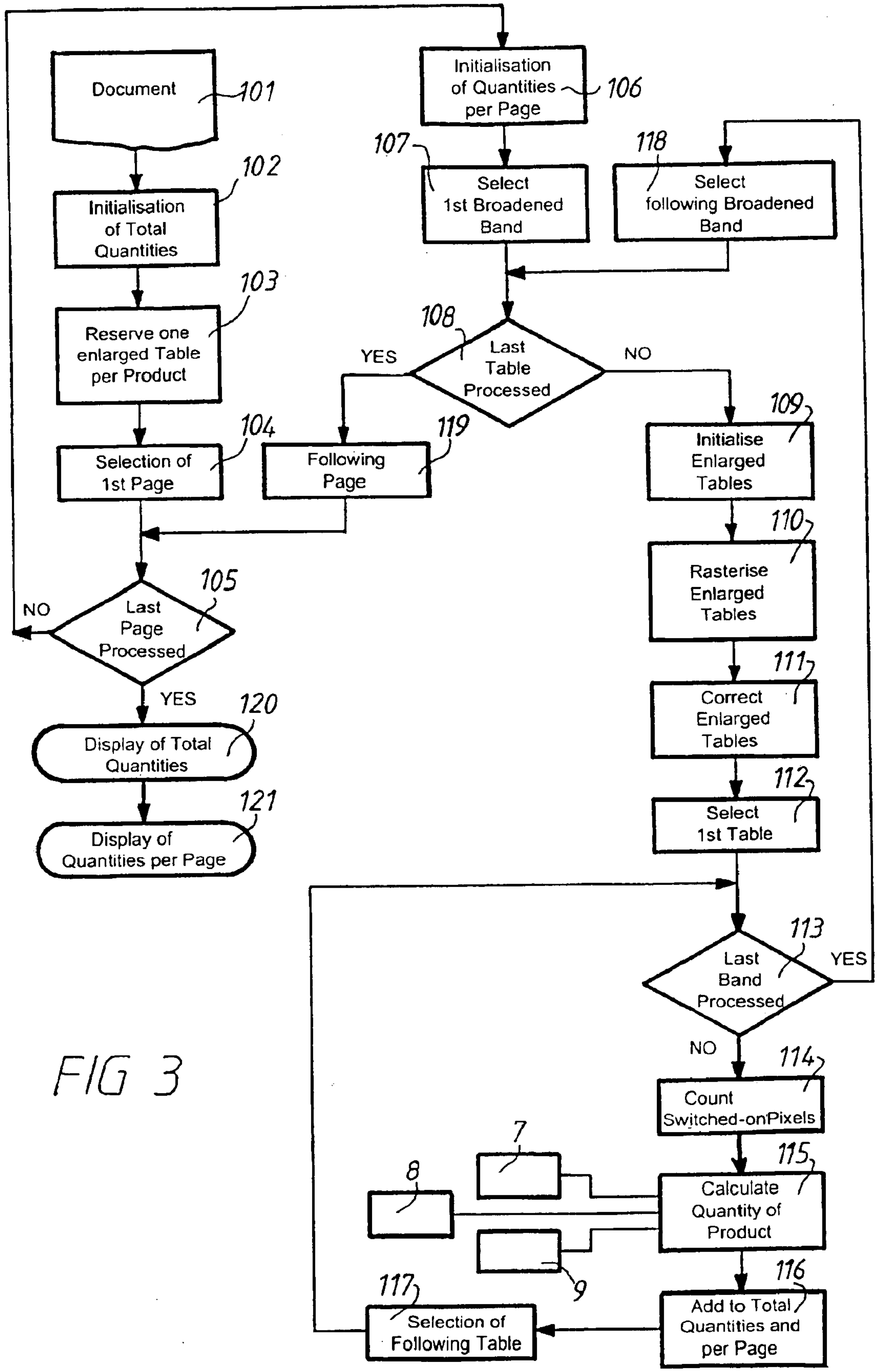
FIG. 3 is a flow diagram describing the implementation of the prediction method.

FIG. 3 is a flow diagram describing more precisely the operations performed during the implementation of the prediction process, for example by means of the computer in FIG. 1 connected to its printer 210 or to a printer accessible through the network 400 via another computer. The starting point is a file 101 in which the document to be printed is stored in the form of digital information.

The following operation 102 consists of initialising the total volumes of the printing products in a memory, which will be consulted for the final display. The following operation 103 consists of reserving, in the system, the memory capacity necessary for creating as many enlarged tables as there are different printing products needed for printing the document.

The operation 104 consists of selecting a first page in the digital information contained in the file 101.

The operation 105 is a test for checking whether the last page has been processed.

If the response is no, the step 106 is passed to, initialising the quantities of printing products necessary for a page, in a memory reserved for this purpose, which will be consulted for the final display.

The following step 107 consists of selecting a first broadened band in this page.

The step 108 is a test for determining whether all the bands of the page have been processed.

If the response is no, step 109 is passed to, which consists of initialising all the enlarged tables corresponding to the different monochromatic components of the band.

The following step 110 (rasterisation) consists of filling all the enlarged tables corresponding respectively to the monochromatic components of the broadened band currently being processed.

The operation 111 consists of applying the correction algorithms to all the enlarged tables of said broadened band.

The operation 112 consists of choosing one of these tables with a view to counting the switched-on pixels in it.

The operation 113 is a test which checks whether all the tables corresponding to a broadened band have been processed.

If the response is no, step 114 is passed to, which consists of counting the "useful" pixels of the table under consideration.

The step 115 consists of calculating the quantity of corresponding printing product. This calculation takes account of the values of the parameters selected in different memories 7, 8 and 9 as in the case of FIG. 2, in order to take account of the model of printer, the type of cartridge used and the printing product itself.

The operation 116 consists of adding the quantity calculated at operation 1115 to the quantities previously counted and added.

At the operation 117, the following enlarged table is selected and step 113 is returned to.

When all the tables have been processed, the response to the test 113 becomes positive and a step 118 is passed to, consisting of selecting the following broadened band before returning to the test 108.

When the response at the test 108 becomes positive, this means that all the pages have been tested and step 119 is passed to, which consists of processing the following page, returning to the test 105.

When all the pages have been processed, the test 105 becomes positive and it is then possible to display the total quantities (step 120) of all the printing products necessary for printing the entire document as well as the partial quantities (step 121) indicating the corresponding quantifies necessary for printing each page.

Naturally, the invention also relates to any device (that is to say any equipment or set of equipment connected together) having means for implementing the method described above. These means have been described here with reference to FIGS. 1 and 2. In this case, such a device can consist of at least one computer and one printer, or even two computers connected in a network with at least one printer.

The invention covers any storage means such as a magnetic tape, diskette, CD-ROM (fixed-memory compact disc) or rewriteable compact disc, integrated or not into the device, possibly removable, and provided that it contains a program at least partially implementing the method described. Such a storage means can be read by a computer or microprocessor for implementing the method.

In addition to the means of predicting the quantities of printing products necessary for printing each page, as described above, other developments of the invention can require the use of means of measuring the quantities of printing products actually available in the reservoirs.

Figure 4:
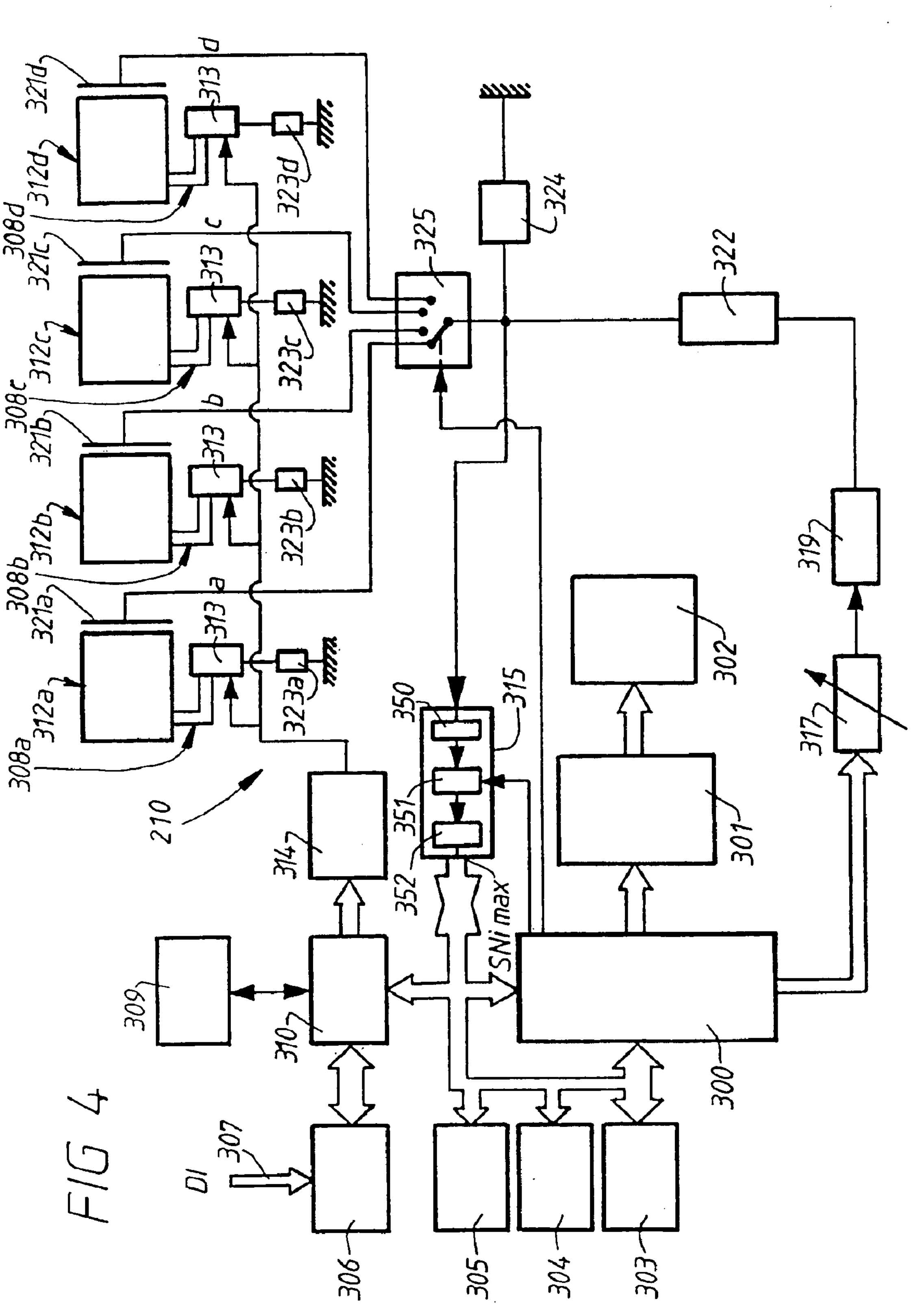
FIG. 4 is a block diagram of a printer incorporating means of measuring the actual quantity of printing product contained in each reservoir.

Considering more particularly FIG. 4, a printer 210 is depicted, which is here a colour printer receiving data to be printed DI representing a text or an image, by means of a parallel input/output port 307, connected to the network 400 and linked to an interface circuit 306, itself linked to an ink ejection control circuit 310 which controls the print heads 313*a*, 313*b*, 313*c*, 313*d* via an amplification circuit 314. The print heads are respectively connected to printing product reservoirs 312a, 312b, 312c, 312d. According to the example, each reservoir is connected by a pipe to the corresponding print head 313a–313d which is electrically connected to earth by means of a low-value resistor 323a–323d. The reservoir 312a contains a black printing product for monochrome or four-colour printing. The reservoirs 312b, 312c, 312d contain printing products of different colours, for colour printing. The three colours are conventionally magenta, cyan and yellow.

In the example, the reservoirs 312a–312d and the print heads 313a–313b are mounted on a carriage made to move along guidance means formed by parallel rods and rails. The carriage is moved in a reciprocating motion along these guidance means. It is driven by a motor 302, by means of a belt mechanism, well-known to persons skilled in the art. The movement path of the carriage and therefore of the print heads 313a–313d is parallel to a line to be printed on a printing medium such as a sheet of paper. This printing medium is moved at right angles to the movement parts of the carriage by the mechanism of the printer, known per se.

The printer also has a main data processing circuit 300 associated with a read only memory 303 and a random access memory 309. The read only memory 303 contains the operating programmes of the main processing circuit whilst the random access memory 309, also associated with the printing product ejection control circuit 310, temporarily stores the data received by means of the interface 306 and the data produced by the main processing circuit 300. The latter is connected to a display 304 on which it controls the display of messages indicating the functioning of the printer in general, and in particular, as will be seen below, information on the quantity of printing product remaining in the reservoir. This information can of course be transmitted to the computer in order to be displayed on the screen 503.

The main processing circuit 300 is connected to a keyboard 305, by which the user can transmit operating commands to the printer. The processing circuit also controls the motor 302 which drives the carriage, by means of an amplification circuit 301. This motor is here advantageously of the stepping type.

Means of measuring the quantities of printing products contained in the different reservoirs comprise a capacitive arrangement 308a–308b, selected by a selector 325, comprising a reservoir and the corresponding print head as well as a metallic plate 321a, 321b, 321c, 321d constituting one of the plates of a capacitor including the corresponding reservoir.

More precisely, it can be considered that this metallic plate 321a–321d constitutes, from the electrical point of view, a plate of a capacitor connected to an extremum detector of detection and measurement means 315 of the printer. The latter are composed more particularly, mounted in cascade, of an amplifier 350 whose input is connected to the plate 321, an extremum detector 351 controlled by the main processing circuit 300, notably for resetting it to zero, and an analogue to digital converter 352 whose output communicates with the main processing circuit 300. The latter is programmed to detect and store a digital value delivered by the converter 352 and representing a signal extremum applied to the input of the amplifier 350 after reinitialisation of the extremum detector 351.

A resonant circuit comprises an oscillator 317 with adjustable frequency, controlled by the main processing circuit 300, whose output is connected to an amplifier 319 which applies signals, through a resistor 322, to the resonant circuit comprising an inductor 324 and a selected capacitive arrangement 308a–308d including the plate 321a–321d, the reservoir 312a–312d and its conductive printing product, the print head 313a–313d connected to the reservoir and the low-value resistor 323a–323d connected to earth. The whole forms a capacitive branch equivalent, from the electrical point of view, to two capacitors and one resistor connected in series. Thus such a capacitor is formed by the plate 321, the insulating wall of the reservoir 312 as a dielectric and the conductive printing product contained in the reservoir as a second plate of the capacitor. In addition, the print head 313 has a dielectric part and a conducting part which form the other capacitor, the latter being connected to earth by the low-value resistor 323. The different plates 321a–321d are connected to the input of the detector 315 and to the other constituents of the resonant circuit by the selector 325 controlled by the circuit 300. By this means, each capacitive branch can be brought into service in succession.

Each measurement of a quantity of product actually available in a reservoir consists for example of applying an alternating signal to one of the capacitive branches connected to the remainder of the resonant circuit, seeking the resonance conditions and analysing a resulting signal applied to the input of the detection measurement means 315 in order to derive therefrom the quantity of printing product available in this reservoir.

Naturally, the invention can be implemented with any type of system for measuring the quantities of printing products available in the reservoirs; the capacitor system described above being only one example.

Figure 5:
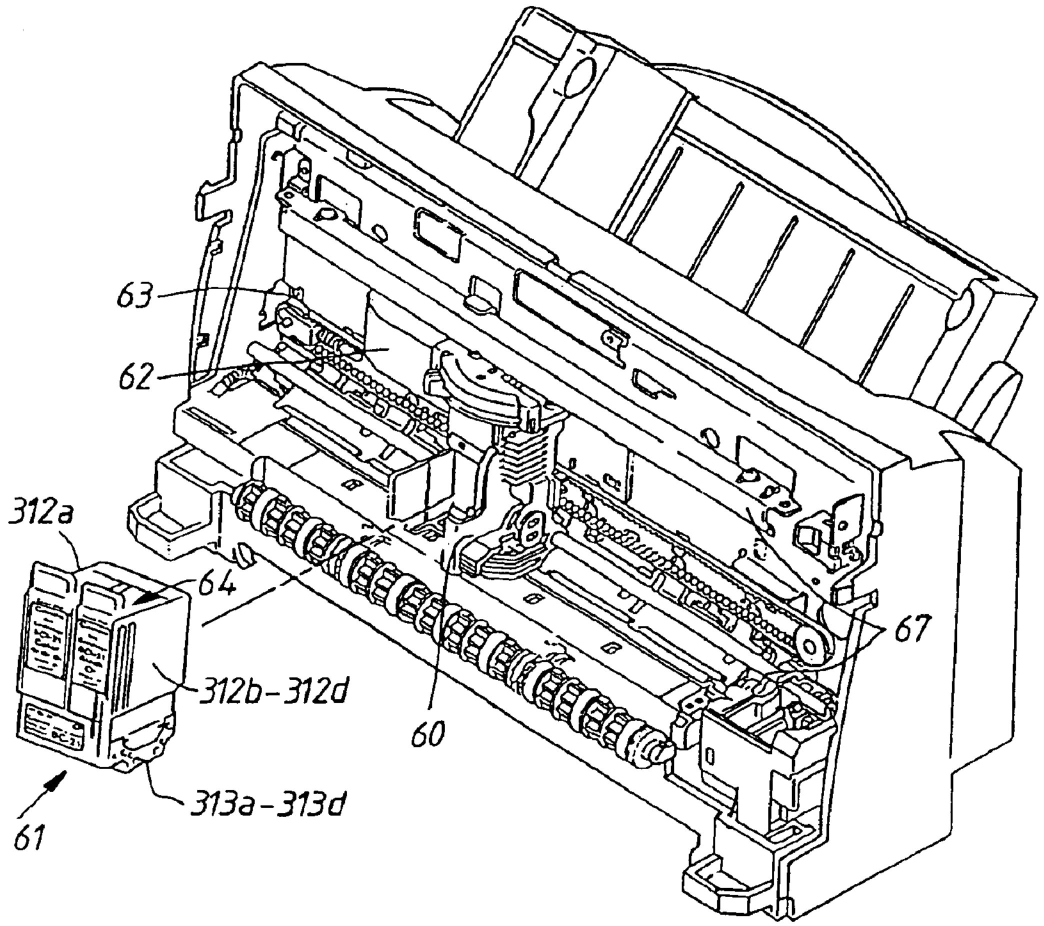
FIG. 5 is a view of the colour printer with its printing product reservoirs.

FIG. 5 depicts the structure of a conventional inkjet colour printer. There can be seen a carriage 60 adapted to receive a printing unit 61, the lower part of which includes the print heads 313a–313d and the top part of which forms a receptacle for the printing product reservoirs. In the example, there can be seen the reservoir of black printing product 312a and an internally compartmentalised cartridge 64 for forming all the reservoirs 312b–312d. Consequently, in this way of arranging the reservoirs, there is a special advantage in having the compartments of the cartridge 64 empty practically simultaneously since the cartridge must be changed as soon as one of the printing products, cyan, magenta or yellow, is exhausted. The process according to the invention described below modifies the order of printing of the pages in order to obtain this result. In order to simplify the description, in drawing up the following flow diagrams, solely three colour printing products, cyan, magenta and yellow, are considered. However, the same process can be used by integrating the monitoring and taking into the account the level of black printing product contained in the reservoir 312a.

Unit 61, once placed on the carriage 60, is driven in a reciprocating movement along a movement path formed by guide rails 67. The motor 302, not visible in FIG. 5, drives the carriage 60 by means of a belt device 63. The movement path of the print head is parallel to a line on a printing medium, not shown, such as a sheet of paper. A flat braid of electrical cable 62 establishes the connection between the print head and the remainder of the electronic circuits described with reference to FIG. 4.

Figure 6:
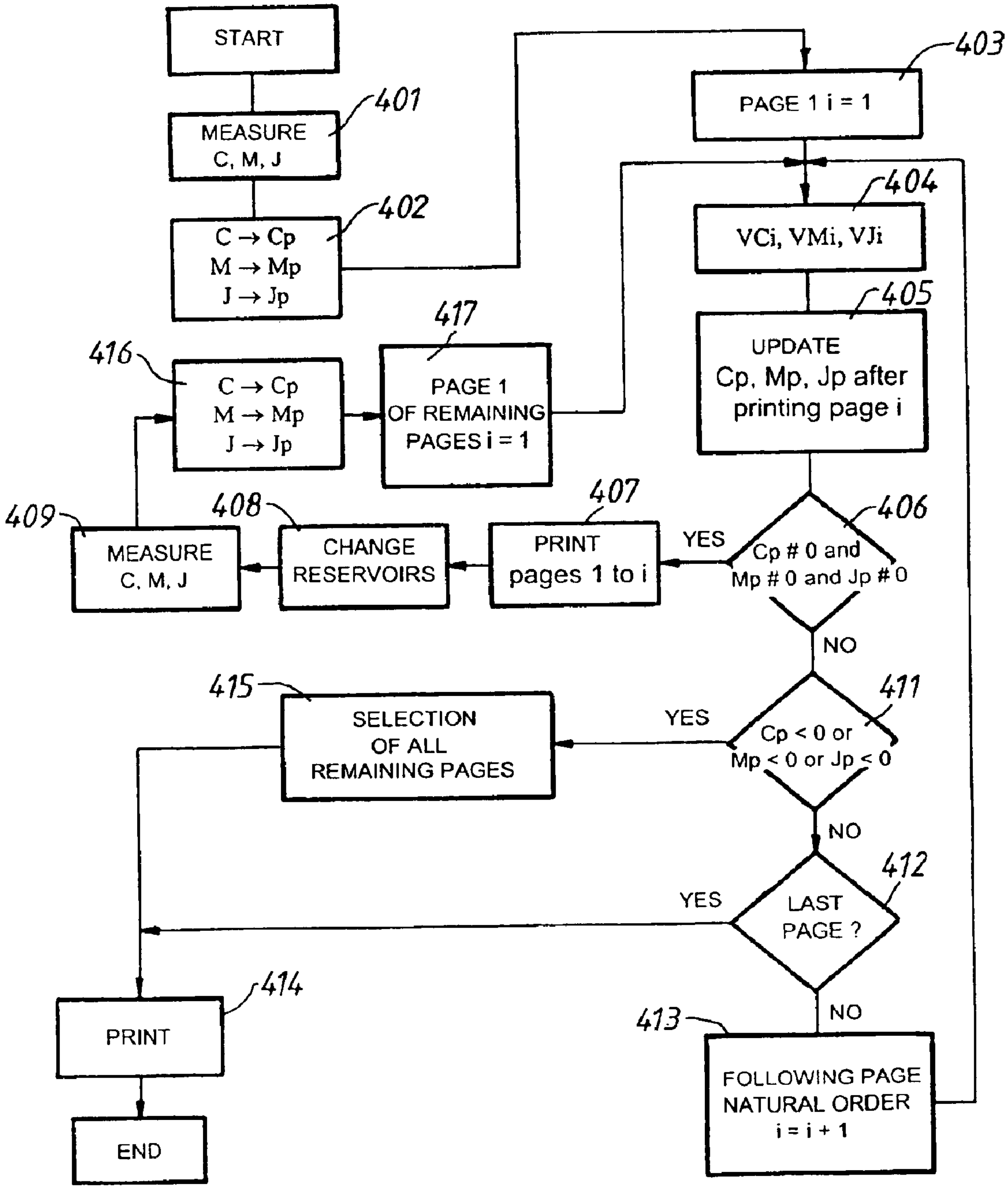
FIG. 6 is a flow diagram of the global implementation of the method of the invention.

The flow diagram of FIG. 6 illustrates the process of selecting the pages in accordance with the invention in order to optimise the consumption of the printing products, using the data supplied on the one hand by the means of measuring the levels of printing products available in the reservoirs (here the word reservoir designates in fact a compartment of the cartridge 64) and on the other hand the predictions of the quantities necessary for printing each page. In the example, it is assumed that all the quantities necessary have been determined a priori by using a method in accordance with the one described with reference to FIG. 3. It is assumed therefore that all these quantities, Ci for cyan, Mi for magenta and Ji for yellow, are available in a memory of the computer or printer. It is clear that i indicates the number of the page in the natural order of the document.

At step 401, a measurement is made of the actual levels of the quantities actually available in the reservoirs, C, M and J, for example using the capacitive measuring means described with reference to FIG. 4.

At step 402, three variables Cp=C, Mp=M and Jp=J are initialised.

A step 403 is next passed to, initiating a process concerning the first page P1. In other words, the values of index i for i=I are considered.

At the step 404, the predicted quantities of printing product necessary for printing the page under consideration will be sought in memory. These quantities are denoted, for the $i^{th}$ page, VCi, VMi and VJi.

At step 405, the levels Cp, Mp and Jp are updated after (virtual) printing of the page under consideration. The new values are:

Cp−VCi→Cp

Mp−VMi→Mp

Jp−VJi→Jp.

As a variant, if, in memory, not all the values VCi, VMi and VJi are available, step 403 consists of extracting from a file the digital information representing the page and transmitting it to the system of predicting the necessary quantities, previously described. The step 404 then consists no longer of simply reading the values in memory but of calculating them at this moment.

The step 406 is a test which consists of checking whether all the quantities of printing products available in the different reservoirs after virtual printing of the page are close to zero, but positive, with a given tolerance, for example around 5%. If the response at test 406 is negative, the test 411 is passed to, which checks whether one of the values Cp, Mp or Jp has become "negative", which means that at least one of the printing products is insufficient in quantity in the reservoir to allow correct printing of the page under consideration. If the response at the test 411 is negative, step 413 is passed to, which consists of checking whether the page which has just been processed virtually is the last page of the document. If the response is no, step 413 is passed to, which consists of "obtaining" the following page in the natural order of the document; i=i+1 and step 404 is returned to.

If at a given moment of running through the loop which has just been described, the response to the test 406 becomes positive, this means that the natural order of the pages as far as a certain page is suitable for practically simultaneously emptying the reservoirs at the same time. Step 407 is then passed to, which consists of printing pages 1 to i in the natural order of the document, even if these pages represent only part of the document. Step 408 is then passed to, which consists of displaying a message indicating to the user the need to change the reservoirs, that is to say in this case the cartridge 64. Once this operation has been performed, the process passes to the step 409, which consists of actually measuring the levels C, M and J in order to know the quantities available in the reservoirs which have been replaced. Step 416 which follows is an initialisation step similar to the step 402. As from this moment, the pages which remain are considered to be a reduced document and step 417 is passed to, which consists of "obtaining" the first page of the remaining pages. i=1 is then considered and the process recommences at step 404.

If at a given moment of running through the process, the response to the test 411 is positive, a step 415 is passed to, which consists of selecting all the remaining pages (not actually printed) in order to define a selection thereof, which is no longer in the natural order of the pages of the document. The process of step 415 will be explained with reference to FIG. 7. If this process ends up at a positive result, step 414 is passed to, which consists of printing a selection of pages determined by the process of step 415.

In addition, if at a given moment the response to the test 413 is positive, this means that the entire document can be printed without changing the reservoirs, and the printing step 414 is also passed to.

Figure 7:
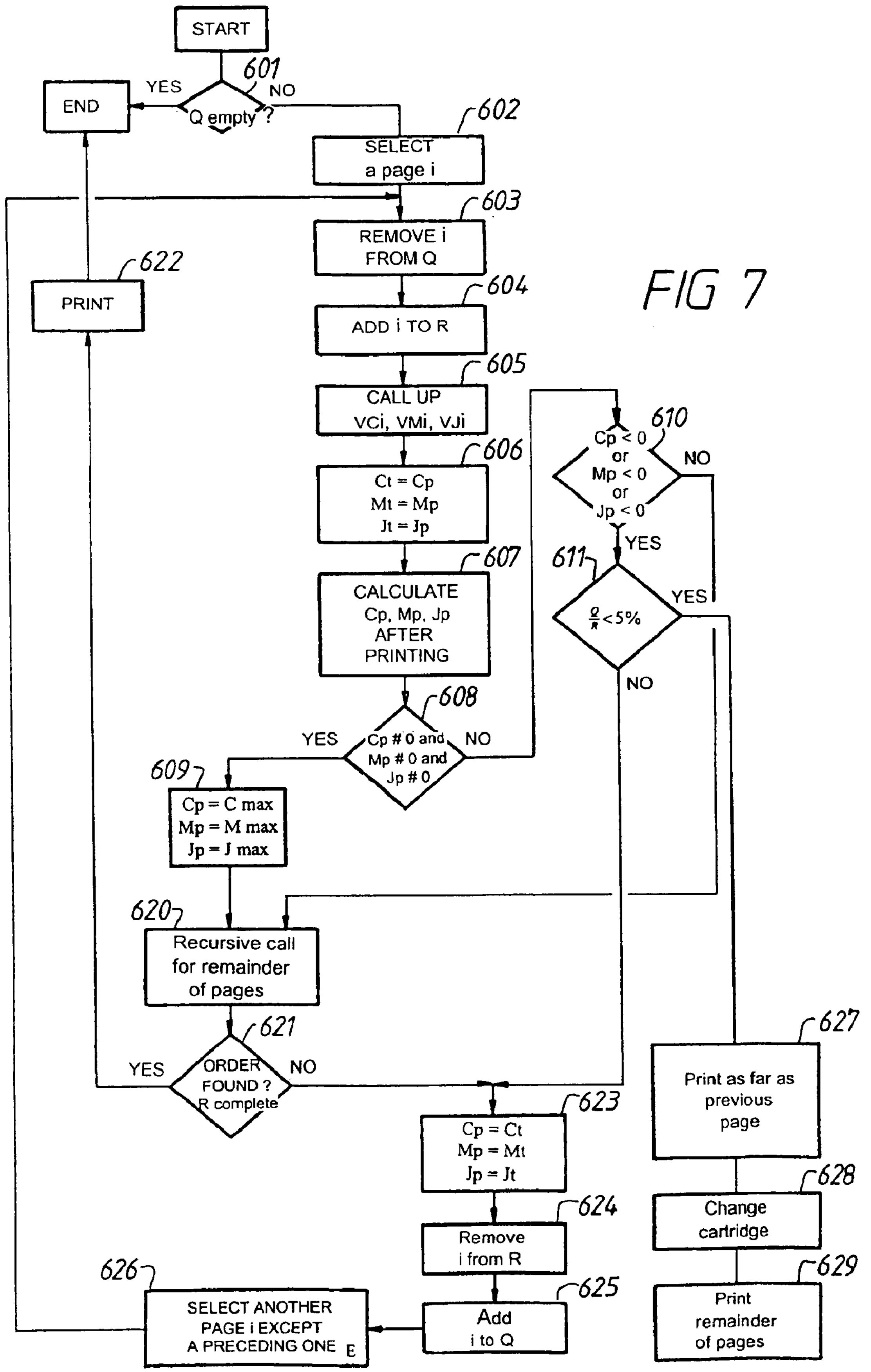
FIG. 7 is a flow diagram of the implementation of a selection of pages, constituting a step of the method.

FIG. 7 describes more precisely the process of selecting and ordering the remaining pages triggered when the test 411 indicates that at least one of the reservoirs does not contain a sufficient quantity of printing product to print a page under consideration.

The flow diagram of FIG. 7 depicts the adaptation to the invention of a recursive operational search program (that is to say one capable of calling itself) of the type "search first in-depth". Such a program is for example described in a work entitled "Elementary Graph Algorithms", second edition, by Robert Sedgevick, chapter 29, page 423, reference ISBN 0 201 06673 4.

In this algorithm, Q represents the list of pages to be processed whilst R represents the list of pages selected in a given order. The purpose of the processing is therefore to draw up a list R from elements in the list Q removed from it in a certain order. The program commences with a test 601 consisting, of checking whether the set Q is empty. If the response is no, operation 602 is passed to, consisting of selecting a page i from the set Q, possibly at random. The operation 603 is then passed to, consisting of removing the page i from the set Q, and then to the operation 604, consisting of adding the page i to the set R. Next, the operation 605 consists of "calling up" the quantities of printing product VCi, VMi and VJi, already stored. As a variant, if these quantities have not been previously stored, they can be calculated at this stage.

Next, the operation 606 consisting of defining temporary variables Ct, Mt and Jt representing the quantities of printing products actually available in the different reservoirs at this moment, that is to say before the virtual printing of the page under consideration. It therefore gives:

Cp→Ct

Mp→Mt

Jp→Jt.

The operation 607 consists of calculating the quantities available after printing the page under consideration and consequently obtaining new virtual values for Cp, Mp and Jp. A test 608 is then passed to, consisting of checking whether each of these quantities is practically zero but positive, for example to within 5%. If the response is no, the test 610 is passed to, which consists of checking whether at least one of these values has become "negative". If the response to this test is negative, step 620 is passed to, which in fact symbolises the recursive nature of the program, that is to say the possibility of calling itself for the remainder of the pages. In this case, the other pages are processed by restarting at step 601. If at a given moment the result of the test 601 is positive, the program goes to its end. Each recursive call 620 is followed by a test 621 consisting of checking whether the set R is complete, that is to say whether an order meeting the requirements has been found. If the response is yes, a print instruction is sent and the program ends.

In addition, if the response to the test 608 is positive, this means that a certain number of pages have been found making it possible to empty all the reservoirs practically simultaneously. This information is stored in memory and displayed. The step 609 is then passed to, simulating a change in the reservoirs since the values of Cp, Mp and Jp become respectively C max, M max and J max. The step 620 is then passed to, that is to say to the recursive call of the program itself for the remainder of the pages.

In addition, if the test 610 becomes positive, the test 611 is passed to, consisting of checking whether the ratio between Q and R is less than a predetermined value, for example around 5%. If the response is positive, it is considered that the losses of printing products are acceptable and it is decided to print the previous pages, except the last which has ended in a positive test 610. This is the step 627.

Then, at step 628, a message is displayed indicating to the user the need to change the reservoirs (cartridge). The final step is step 629, consisting of printing the remainder of the pages with the printing products of the new cartridge.

If the response to the test 611 is negative, or if the response to the test 621 is negative, this means that there is no possible solution starting from a selection of the page i. In this case, the step 623 is passed to, which consists to returning to the values of Cp, Mp and Jp before the virtual printing (that is to say step 606) and then to the operation 624, which consists of removing the page i from the set R, and then again to the operation 625, which consists of reintegrating the page i in the set Q. These parameters being restored, the step 626 is then passed to, which consists of testing another selection starting from another page i whilst refraining from repeating the page i which has just been tested. Step 603 is then passed to again.

Naturally, the invention also relates to any device (that is to say any equipment or set of equipment connected to each other) having means for implementing the method described above. These means have been described here with reference to FIGS. 1, 2, 4 and 7. In this case, such a device can consist of at least one computer and one printer, or even two computers connected in a network with at least one printer.

The invention covers any storage means such as a magnetic tape, diskette, CD-ROM (fixed-memory compact disc) or rewriteable compact disc, integrated or not into the device, possibly removable, provided that it contains a program at least partially implementing the method described. Such a storage means can be read by a computer or a microprocessor for implementing the method.

What is claimed is:

1. Method of predicting a quantity of a printing product necessary for printing a document, comprising the steps of:

storing a document in its entirety as digital data;

dividing each page of the document into wider bands of the digital data, wherein a wider band is a band increased by an overlap margin belonging to an adjacent band;

creating, from the digital data, a table (T) of limited capacity describing a monochromatic component of a wider band, with the monochromatic component corresponding to the printing product and each cell of the table representing at least a pixel;

counting (6) a number of switched-on pixels in the table, with a switched-on pixel corresponding to a pixel for which a portion of the printing product must be ejected; and deriving from a number of switched-on pixels corresponding to each wider band a necessary quantity (10) of the printing product before enabling or demanding printing.

2. Method according to claim 1, wherein the table (T) of limited capacity is created with a capacity less than a capacity necessary for describing the monochromatic component, wherein groups of pixels of the monochromatic component are entered therein successively, and wherein, on each occasion of counting, a number of switched-on pixels is counted (6) until all the monochromatic component has been entered in the table and the switched-on pixels have been counted.

3. Method according to claim 1, further comprising a calculation step (10) of multiplying the number of switched-on pixels by a value representing an elementary quantity of the printing product.

4. Method according to claim 3, wherein the method is for an inkjet printing system, and wherein the value represents a value of a droplet of the printing product that is ejected.

5. Method according to claim 4, wherein the value is preselected according to predetermined parameters, including a type of printer (7) and/or a type of cartridge (8) and/or a type of printing product (9).

6. Method according to claim 5, wherein a set of values is stored and one of the values is selected according to a combination of the predetermined parameters.

7. Method according to claim 1, wherein the steps are performed in order to determine a number of switched-on pixels (6) corresponding to each page, and wherein a respective quantity of the printing product necessary for printing each page is derived therefrom.

8. Method according to claim 7, wherein necessary quantities of the printing product for all pages of the document are added (120).

9. Method according to claim 1, further comprising the step of producing an item of information usable by a user from the derived necessary quantity of the printing product.

10. Method according to claim 1, wherein the method is implemented in a computer (20) connected to a printer (210).

11. Method according to claim 1, wherein the method is implemented in a computer connected by a network (400) to another computer connected to a printer.

12. Method according to claim 1, wherein the step of counting the number of switched-on pixels in the table describing at least part of the monochromatic component of the wider band excludes switched-on pixels corresponding to an excess part of the table.

13. Method according to claim 1 or claim 69, wherein the table is modified by applying a known correction algorithm entailing modification of the switched-on pixels.

14. Method according to claim 13, wherein the method is used for colour printing, wherein as many tables are created as there are colours, with each table describing a monochromatic component of the document, and wherein a correction algorithm is applied to all the tables before separately effecting counting (6) of the switched-on pixels in each table for predicting different quantities of printing products required, of all the colours concerned.

15. Device for predicting a quantity of a printing product necessary for printing a document, comprising:

storage means for storing a document in its entirety as digital data;

divider means for dividing each page of the document into wider bands of the digital data, wherein a wider band is a band increased by an overlap margin belonging to an adjacent band;

creation means for creating, from the digital data, a table of limited capacity describing a monochromatic component of a wider band, with the monochromatic component corresponding to the printing product and each cell of the table representing at least a pixel;

counter means for counting (6) a number of switched-on pixels in the table, with a switched-on pixel corresponding to a pixel for which a portion of the printing product must be ejected; and deriver means for deriving from a number of switched-on pixels corresponding to each wider band a necessary quantity (10) of the printing product before enabling or demanding printing.

16. Device according to claim 15, wherein the table of limited capacity is created with a capacity less than a capacity necessary for describing the monochromatic component, wherein the device further comprises entry means for successively entering therein groups of pixels of the monochromatic component, and wherein the counter means, on each occasion of counting (6), counts a number of switched-on pixels until all the monochromatic component has been entered in the table and the switched-on pixels have been counted.

17. Device according to claim 15, further comprising calculation means (10) for multiplying the number of switched-on pixels by a value representing an elementary quantity of the printing product.

18. Device according to claim 17, wherein the device is included in an inkjet printing system, and wherein the value represents a volume of a droplet of the printing product that is ejected.

19. Device according to claim 18, further comprising selection means for preselecting the value as a function of predetermined parameters, including a type of printer (7) and/or a type of cartridge (8) and/or a type of printing product (9).

20. Device according to claim 19, further comprising:

second storage means for storing a set of values; and second selection means for selecting one of the values according to a combination of the predetermined parameters.

21. Device according to claim 15, wherein the counter means determines a number of switched-on pixels (6) corresponding to each page; and wherein the deriver means derives from the number of switched-on pixels corresponding to each page, a respective quantity of the printing product necessary for printing each page.

22. Device according to claim 21, further comprising adder means (120) for adding necessary quantities of the printing product for all pages of the document.

23. Device according to claim 15, further comprising production means for producing an item of information usable by a user from the derived necessary quantity of printing product.

24. Device according to claim 15, wherein the device is utilized with a computer (20) and a printer (210).

25. Device according to claim 15, wherein the device is utilized with a computer connected by a network (400) to another computer connected to a printer.

26. Device according to claim 15, wherein the counter means excludes switched-on pixels corresponding to an excess part of the table describing at least part of a monochromatic component of the wider band.

27. Device according to claim 15 or claim 26, further comprising modification means for modifying the table by applying a known correction algorithm entailing modification of the switched-on pixels.

28. Device according to claim 27, wherein the device is used for colour printing, wherein the creation means creates as many tables as there are colours, with each table describing a monochromatic component of the document, and further comprising:

correction means for applying a correction algorithm to all the tables; and means for separately effecting counting (6) of the switched-on pixels of each table for predicting different quantities of required printing products, of all the colours concerned.

29. Method of managing printing product resources available in a colour printer that includes several reservoirs of different printing products, comprising the steps of:

dividing (2) a document stored as digital data into groups of digital data representing pages;

predicting (10) a quantity of each printing product necessary for printing each page of the document, including:

dividing each page of the document into wider bands of the digital data, wherein a wider band is a band increased by an overlap margin belonging to an adjacent band, creating, from the digital data, a table (T) of limited capacity describing a monochromatic component of a wider band, with the monochromatic component corresponding to the printing product and each cell of the table representing at least a pixel, counting (6) a number of switched-on pixels in the table, with a switched-on pixel corresponding to a pixel for which a portion of the printing product must be ejected, and deriving from a number of switched-on pixels corresponding to each wider band a necessary quantity (10) of the printing product before enabling or demanding printing;

measuring (317, 324, 315), before printing, a quantity of a printing product available in a reservoir, for each reservoir;

determining a selection of pages (415) that would ensure exhaustion, at least approximately simultaneously, of at least one group of the reservoirs; and sending a message and/or triggering implementation of a processing entailing the selection of pages.

30. Method according to claim 29, further comprising the steps of:

predicting a quantity of each printing product necessary for printing pages in their natural order;

updating, after each series of predictions concerning a page, a quantity of each printing product that would be available in each reservoir;

checking (406) after each updating whether a group of at least at least some of the reservoirs are almost empty, and sending a message (408) indicating a need to change or fill the group of the reservoirs.

31. Method according to claim 30, wherein, after changing the group of the reservoirs, processing (417) is resumed on remaining pages of the document, taking into consideration a reduced number of pages.

32. Method according to claim 30, wherein, during processing of pages in their natural order, predicted quantities of products consumed for each page are stored.

33. Method according to claim 29, wherein, in order to carry out a selection, it is checked, page after page, whether there is a change from a state in which all reservoirs in a group are not empty to a state (411) in which at least one of the reservoirs in the group is completely empty, and the selection (415) is decided on when the change occurs.

34. Method according to claim 33, wherein, when the selection is decided on, a quantity of each printing product necessary for printing remaining pages is predicted and stored.

35. Method according to claim 33, wherein, when the selection is decided on, a quantity of each printing product necessary for printing remaining pages is predicted and stored, and wherein the selection includes determining whether a sub-group of pages (620) exists whose printing would result in a group of at least some of the reservoirs being almost empty when printing of the sub-group ends.

36. Method according to claim 35, wherein the sub-group is determined to exist if all structurally related reservoirs (61) forming a cartridge would be empty when printing of the sub-group ends.

37. Method according to claim 35, wherein the sub-group is determined to exist if several structurally related reservoirs forming a cartridge would be empty when printing of the sub-group ends.

38. Method according to claim 36, wherein, if the sub-group is determined to exist, printing the sub-group (627), and wherein at least one message (628) is sent indicating a need to change or fill the group of the reservoirs.

39. Method according to claim 29, further comprising the steps of:

predicting a quantity of a printing product necessary for printing a page;

describing the page by pixels (4); and counting (6) a number of switched-on pixels corresponding to the printing product.

40. Method according to claim 39, wherein the step of predicting the quantity of a printing product necessary for printing a page includes:

using digital data on the page under consideration;

creating a table ($T_a$, $T_b$, $T_c$, $T_d$) describing at least part of a monochromatic component, with the monochromatic component corresponding to the printing product and each cell of the table representing a pixel;

counting a number of switched-on pixels in the table and deriving from the number of switched-on pixels in the table a necessary quantity of the printing product.

41. Method according to claim 40, wherein the table (T) of limited capacity is created with a limited capacity less than a capacity necessary for describing the monochromatic component, there are entered successively in the table (T) of limited capacity groups of pixels of the monochromatic component, and, on each occasion of counting, a number of switched-on pixels is counted until all the monochromatic component has been entered in the table (T) and the switched-on pixels have been counted.

42. Method according to claim 41, further comprising the step of creating a table of limited capacity from digital data representing adjacent wider bands of the page.

43. Method according to claim 42, wherein overlapping wider bands are selected, and, using digital data corresponding to the overlapping wider bands, at least one enlarged table (103) is created, which allows an image reprocessing entailing a modification of the switched-on pixels, wherein the enlarged table is modified by applying a known correction algorithm (111), and wherein counting of switched-on pixels corresponding to an excess part of the enlarged table is excluded.

44. Method according to claim 43, wherein the method is used for colour printing, wherein as many enlarged tables (103) are created as there are printing products, with each enlarged table describing a monochromatic component, wherein a correction algorithm (111) is applied to all the enlarged tables before separately effecting counting of the switched-on pixels in each enlarged table for predicting different quantities of required printing products, of all colours concerned.

45. Method according to claim 40, further comprising a calculation step of multiplying (10) the number of switched-on pixels by a value representing an elementary quantity of the printing product.

46. Method according to claim 45, wherein the method is for an inkjet printing system, and wherein the value represents a value of a droplet of the printing product that is ejected.

47. Method according to claim 46, wherein the value is preselected according to predetermined parameters, including a type of printer (7) and/or a type of cartridge (8) and/or a type of printing product (9).

48. Method according to claim 47, wherein a set of values is stored and one of the values is selected according to a combination of the predetermined parameters.

49. Method according to claim 29, wherein measurement of a quantity of a printing product available in a reservoir includes arranging a capacitive branch including the reservoir (312*a*, 312*d*), applying an alternating signal (317) to the capacitive branch, and analysing a resulting signal (315) in order to derive from the resulting signal the quantity of the printing product available.

50. Method according to claim 29, wherein the measuring step for measuring a quantity of printing product available in a reservoir includes arranging a capacitive branch including the reservoir (312*a*, 312*d*), applying an alternating signal (317) to the capacitive branch, and analyzing a resulting signal (315) in order to derive therefrom the quantity of printing product available.

51. Device for managing printing product resources available in a colour printer that includes several reservoirs of different printing products, comprising:

divider means for dividing (2) a document stored as digital data, into groups of digital data representing pages;

prediction means for predicting (10) a quantity of each printing product necessary for printing each page of the document, including:

means for dividing each page of the document into wider bands of the digital data, wherein a wider band is a band increased by an overlap margin belonging to an adjacent band, means for creating, from the digital data, a table of limited capacity describing a monochromatic component of a wider band, with the monochromatic component corresponding to the printing product and each cell in the table representing at least a pixel, means for counting (6) a number of switched-on pixels in the table, with a switched-on pixel corresponding to a pixel for which a portion of the printing product must be ejected, and means for deriving from a number of switched-on pixels corresponding to each wider band a necessary quantity (10) of the printing product before enabling or demanding printing;

measurement means for measuring (317, 324, 315), before printing, a quantity of a printing product available in a reservoir, for each reservoir, determination means for determining a selection of pages (415) that would ensure exhaustion, at least approximately simultaneously, of at least one group of the reservoirs; and message means for sending a message and/or triggering implementation of a processing, entailing the selection of pages.

52. Device according to claim 51, wherein the prediction means predicts a quantity of each printing product necessary for printing pages in their natural order, and further comprising:

update means for updating, after each series of predictions concerning a page, a quantity of each printing product that would be available in each reservoir;

checking means for checking (406), after each updating, whether a group of at least some of the reservoirs are almost empty; and notice means for sending a message (408) indicating a need to change or fill the group of the reservoirs.

53. Device according to claim 52, further comprising storage means for storing predicted quantities of products consumed for each page, when processing pages in their natural order.

54. Device according to claim 53, wherein the prediction means predicts a quantity of each printing product necessary for printing remaining pages, and wherein the storage means stores the predicted quantity of each printing product necessary for printing the remaining pages, when a selection of pages is decided on.

55. Device according to claim 53, wherein the prediction means predicts a quantity of each printing product necessary for printing remaining pages, and wherein the storage means stores the predicted quantity of each printing product necessary for printing the remaining pages, when a selection of pages is decided on, and wherein the determination means determine whether a sub-group of pages (620) exists whose printing would result in a group of at least some of the reservoirs being almost empty when printing of the sub-group ends.

56. Device according to claim 51, wherein the prediction means predicts a quantity of a printing product necessary for printing a page, and further comprising:

describer means for describing the page by pixels (4); and counter means for counting (6) a number of switched-on pixels corresponding to the printing product.

57. Device according to claim 56, further comprising:

creation means for creating a table ($T_a$, $T_b$, $T_c$, $T_d$) describing at least part of a monochromatic component, with the monochromatic component corresponding to the printing product and each cell of the table representing a pixel, wherein the counter means counts a number of switched-on pixels in the table; and deriver means for deriving from the number of switched-on pixels in the table a necessary quantity of the printing product.

58. Device according to claim 57, wherein the table of limited capacity is created with a limited capacity less than a capacity necessary for describing the monochromatic component, and further comprising:

entry means for successively entering in the table of limited capacity groups of pixels of the monochromatic component, and wherein the counter means, on each occasion of counting, counts a number of switched-on pixels until all the monochromatic component has been entered in the table of limited capacity and the switched-on pixels have been counted.

59. Device according to claim 58, wherein the creation means creates the table of limited capacity from digital data representing adjacent wider bands of the page.

60. Device according to claim 59, further comprising:

selection means for selecting overlapping wider bands, wherein the creation means creates at least one enlarged table (103) from digital data corresponding to the overlapping wider bands, which allows an image reprocessing entailing a modification of the switched-on pixels;

modification means for modifying the enlarged table by applying a known correction algorithm (111); and exclusion means for excluding counting of switched-on pixels corresponding to an excess part of the enlarged table.

61. Device according to claim 60, wherein the device is used for colour printing, wherein the creation means creates as many enlarged tables (103) as there are printing products, with each enlarged table describing a monochromatic component, and further comprising correction means for applying a correction algorithm (111) to all the enlarged tables; and means for separately effecting counting of the switched-on pixels in each enlarged table for predicting different quantities of required printing products, of all colours concerned.

62. Device according to claim 57, further comprising calculation means for multiplying (10) the number of switched-on pixels by a value representing an elementary quantity of the printing product.

63. Device according to claim 62, wherein the device is used with an inkjet printing system, and wherein the value represents a volume of a droplet of the printing product that is ejected.

64. Device according to claim 63, further comprising preselection means for preselecting the value as a function of predetermined parameters, including a type of printer (7) and/or a type of cartridge (8) and/or a type of printing product (9).

65. Device according to claim 64, further comprising:

storage means for storing a set of values; and selection means for selecting one of the values according to a combination of the predetermined parameters.

66. Device according to claim 51, wherein the measurement means comprises:

a capacitive branch including the reservoir (312$a$, 312$d$);

means for applying an alternating signal (317) to the capacitive branch; and means for analysing a resulting signal (315) in order to derive from the resulting signal the quantity of printing product available.

67. Information storage medium storing a program for causing a programmable processing apparatus to perform a method of predicting a quantity of a printing product necessary for printing a document, wherein the method comprises the steps of:

storing a document in its entirety as digital data;

dividing each page of the document into wider bands of corresponding digital data, wherein a wider band is a band increased by an overlap margin belonging to an adjacent band;

creating, from the digital data, a table of limited capacity describing a monochromatic component of a wider band, with the monochromatic component corresponding to the printing product and each cell of the table representing at least a pixel;

counting a number of switched-on pixels in the table, with a switched-on pixel corresponding to a pixel for which a portion of the printing product must be ejected; and deriving from a number of switched-on pixels corresponding to each wider band, a necessary quantity of the printing product before enabling or demanding printing.

68. Information storage medium according to claim 67, wherein the medium is one of a magnetic tape, a magnetic diskette, a fixed-memory compact disc, and a rewritable compact disc.

* * * * *

UNITED STATES PATENT AND TRADEMARK OFFICE

CERTIFICATE OF CORRECTION

PATENT NO. : 6,903,837 B1
DATED : June 7, 2005
INVENTOR(S) : Jean-Jacques Moreau et al.

It is certified that error appears in the above-identified patent and that said Letters Patent is hereby corrected as shown below:

Column 10,
Line 22, "operation 1115" should read -- operation 115 --; and
Line 38, "quantifies" should read -- quantities --.

Column 15,
Line 24, "consists to" should read -- consists of --.

Column 16,
Line 47, "69," should read -- 12, --.

Column 18,
Line 55, "at least at least" should read -- at least --.

Column 19,
Line 40, "pixel;" should read -- pixel; and --.

Column 21,
Line 38, "determine" should read -- determines --.

Column 22,
Line 27, "comprising" should read -- comprising: --.

Signed and Sealed this

Fourth Day of April, 2006

JON W. DUDAS
*Director of the United States Patent and Trademark Office*